United States Patent
Simmons, Jr. et al.

[11] Patent Number: 6,154,311
[45] Date of Patent: Nov. 28, 2000

[54] UV REFLECTIVE PHOTOCATALYTIC DIELECTRIC COMBINER HAVING INDICES OF REFRACTION GREATER THAN 2.0

[75] Inventors: Frederick Lee Simmons, Jr., Jackson, Miss.; Ron Ferrante, Castaic, Calif.

[73] Assignee: Simtek Hardcoatings, Inc., San Francisco, Calif.

[21] Appl. No.: 09/062,757

[22] Filed: Apr. 20, 1998

[51] Int. Cl.[7] .................. F21V 9/06; G02B 1/10
[52] U.S. Cl. .................. 359/359; 359/350; 359/361; 359/583; 359/589; 359/582; 428/699; 428/701
[58] Field of Search .................. 359/361, 360, 359/350, 359, 584, 589, 583, 582; 427/160, 162, 163.1; 428/699, 701

[56] References Cited

U.S. PATENT DOCUMENTS

| | | | |
|---|---|---|---|
| 4,216,259 | 8/1980 | Groth | 428/216 |
| 5,256,616 | 10/1993 | Heller et al. | 502/350 |
| 5,501,801 | 3/1996 | Zhang et al. | 210/748 |
| 5,595,813 | 1/1997 | Ogawa et al. | 428/212 |
| 5,811,192 | 9/1998 | Takahama et al. | 428/432 |
| 5,854,708 | 12/1998 | Komatsu et al. | 359/509 |
| 5,865,959 | 2/1999 | Meinzer et al. | 204/157.3 |
| 5,873,203 | 2/1999 | Thiel | 52/172 |
| 5,874,701 | 2/1999 | Watanabe et al. | 204/157.15 |
| 5,897,957 | 4/1999 | Goodman | 428/432 |
| 5,897,958 | 4/1999 | Yamada et al. | 446/474 |
| 6,037,289 | 3/2000 | Chopin et al. | 502/2 |

*Primary Examiner*—Cassandra Spyrou
*Assistant Examiner*—John Juba, Jr.
*Attorney, Agent, or Firm*—Wallenstein & Wagner, Ltd.

[57] ABSTRACT

The invention relates to a transparent zero distortion photocatalytic dielectric combiner housing a series of hard durable thin films that reflect 98% of UV, with a plurality of dielectric layers having indices of refraction greater than 2.0 but otherwise is transmissive to light at all wavelengths. The photocatalytic dielectric combiner selectively reflects and concentrates UV from sources such as light fixtures or sunlight within a narrow range of wavelengths on the outer surface of the combiner element, promoting photocatalytic oxidation to decompose bacteria and contaminants, making surfaces the combiner is placed upon self-cleaning, self-sanitizing, and self-deodorizing. The invention is suitable for windows, counter tops, door hardware, plumbing fixtures, and the like. In addition, when a hard, thin-film, decorative, reflective layer is added to the combiner element and placed on top of a smooth hard leveling organic polymer it can provide a viable alternative to electroplated decorative finishes, with a self-sanitizing, self-cleaning, decorative coating. Preferably the film is deposited by alternating low pressure environment deposition techniques.

12 Claims, 4 Drawing Sheets

UV REFLECTIVE PHOTOCATALYTIC DIELECTRIC COMBINER HAVING INDICES OF REFRACTION GREATER THAN 2.0

BACKGROUND OF THE INVENTION

Dielectric combiner technologies have been used primarily in the construction of Heads Up Displays (HUD). Combiners are well known in military applications, specifically for their ability in the cockpit of fighter jets to display information to pilots across the windscreen without obstructing the pilots, view of the outside world. These combiners are unique in there ability to selectively reflect light within a narrow range of wavelengths and thereby reducing glare while remaining optically clear.

The photocatalytic dielectric combiner in this application functions as a UV surface enhancer. The invention decomposes contaminants and harmful bacteria that contact the UV enhanced surface by the photocatalytic oxidation of titanium oxide ($TiO_2$). Since the Fujishima-Honda effect-involving photoelectro-chemical reactions of a semiconducting $TiO_2$ electrode was reported in 1972, attention has been focused on $TiO_2$ as a practical photocatalyst. It has been applied to a variety of environmental problems in addition to water and air purification. In the last few years, research and applications of this photocatalyst have been increasing. This increase may be because it has been proven that only a small amount of UV radiation from various types of lamps, such as fluorescent lamps, is necessary for the photocatalytic decomposition of nearly all contaminants in indoor and outdoor environments. Additionally, it has been demonstrated that the $TiO_2$ photocatalyst is effective for deodorization, sterilization of bacteria, and decomposition of organic contaminants.

In general, photocatalytic reactions are caused by the irradiation of light on semiconductors, particularly where $TiO_2$ is the photocatalytic material. When the photon energy is greater than or equal to the band gap energy of $TiO_2$, i.e., $E=3.2$ ev or $\lambda \leq 400$ nm, an electron (e-) is promoted from the valence band into the conduction band, leaving a hole behind. Some of the electrons which have been excited into the conduction band and some of the holes in the valence band recombine and dissipate the input energy as heat. However, a number of holes can diffuse to the surface of the $TiO_2$ and react with $^-OH$ absorbed on the surface. This reaction forms $^-OH$ radicals, which can decompose the organic compounds existing on the surface into $CO_2$ and $H_2O$ because the potential energy of the $^-OH$ radical is greater than the bonding energy of almost all organic compounds.

Currently, $TiO_2$ films are deposited on various substrates using the Sol-Gel method. The film comprises one or more layers of photoreactive gelatin which has (or have) been subsequently developed by wet chemical processing as disclosed in "Applications of Photocatalytic Reactions Caused by $TiO_2$ Film to Improve the Maintenance Factor of Lighting Systems" by H. Honda, A. Ishizaki (1), R. Soma (2), K. Hashimoto, and A. Fujishima (3) in the Winter 1997 issue of *JOURNAL of the Illuminating Engineering Society*. Honda, et al. discloses a substrate which is dipped into a titanium alkoxide solution, a TPT monomer, or a polymer chelated with a glycol polymer. There may be variations in the mixture as far as what is used but the processing manner is essentially the same, i.e., the substrate is pulled out at a rate which determines the coating thickness. The coated substrate is then heated at about 600° C. to form the crystalline anatase phase.

It usually desirable to construct the film with fringes that are parallel to the surface of the gelatin. However, design constraints, such as optically recorded noise patterns, may prevent this construction. In these cases, the fringes intersect the surface and form a slant fringe pattern which produces extraneous diffraction images. These images would make such films unacceptable for windows, viewing monitors, and decorative applications.

Another limitation with the sol-gel method is mechanical abrasive damage. Such damage is due to the film being an organic material which is extremely susceptible. A further problem with the sol-gel method is the tendency of the layers of the film to delaminate both from the substrate and from adjacent layers. The delamination is due to the differing coefficients of expansion between the various layers of the film. The substrate is subjected to varying thermal conditions, so the layers expand and shrink at varying ratios resulting in delamination between the layers and substrate. It would be desirable to develop a photocatalytic titanium dioxide ($TiO_2$) film which is hard, durable, and abrasion resistant, and does not delaminate or distort surface images. A film can also be deposited on a variety of substrate materials such as plastics, metals, glass, and composites, and may be used in various applications such as window, decorative, medical, food handling and institutional applications to provide a self-cleaning, self-sanitizing and self-deodorizing surface. In addition the UV enhanced dielectric combiner can be placed on an organic leveling polymer to provide a viable alternative to electroplating. Articles such as costume jewelry, television antennas, luggage latches, trophies, lighting fixtures, watches, plumbing fixtures, door hardware, automotive wheels, washing machine and dryer dials, and the like are commonly plated. These surfaces are often in contact with bacteria and, therefore, could benefit from a self-disinfecting, self-sanitizing, hard, durable coating. Consumers typically love the shiny bright chrome and gold-tone finishes that add appeal to many items they purchase. The decorative industry produces these finishes on various kinds of substrates, including but not limited to plastic, zinc, aluminum, and brass, by electroplating. A typical faucet or door hardware manufacturer may electroplate about 90 to 95 percent of all the products produced, and in some companies in the decorative industry the percentage could be 100% of total products produced.

The interest in replacing the electroplating process in decorative applications, and finding alternative methods of coating soft substrates, such as brass, zinc, aluminum, and plastics, is not new. The primary goals are to achieve substrate containment, leveling, desired hardness, surface brilliance, and scratch- and corrosion-resistant surfaces so that maintenance is minimized.

SUMMARY OF THE INVENTION

There is provided in this invention a UV reactive self-cleaning, self-sanitizing, and self-deodorizing photocatalytic dielectric combiner which utilizes a thin dielectric film placed on a substrate to achieve photocatalytic reactions with high UV reflectance and high photopic transmittance. The photocatalytic dielectric combiner herein disclosed comprises a substrate upon which a number of alternating layers of thin dielectric films are deposited. The substrate can be transmissive for all wavelengths of light or non-transmissive to wavelengths of light, but in both cases the dielectric film is highly reflective for wavelengths of light within a predetermined spectrum and is otherwise transmissive. The photocatalytic dielectric combiner is an optically clear, multilayered, hard, durable, thin film comprised of an external contact layer of photocatalytic titanium dioxide ($TiO_2$) that reflects 98% of all UV. The reflection is achieved with a series of tailored thin film dielectric reflectors designed with narrow contoured spectral bandwidths to reflect UV within a predetermined spectrum. The photocatalytic dielectric combiner filters light and reflects UV from a UV output source, which can come from a light fixture or sun light. The UV is then reflected back to the external contact layers of the combiner producing a concentration of UV at the external surface of the combiner element, thus initiating photocatalytic reactions of titanium dioxide ($TiO_2$) and $^-OH$ at the surface of the photocatalytic dielectric combiner. The result is a self-cleaning, self-sanitizing, self-deodorizing surface that kills most bacteria and contaminants that contact the external surface.

The photocatalytic dielectric combiner eliminates the occurrence of distortion which can possibly occur with the sol-gel method. Additionally, the photocatalytic dielectric combiner is less likely to delaminate and does not require environmental protection. The photocatalytic dielectric combiner is less susceptible to mechanical abrasion damage and does not require complex wet chemical development, as does the sol-gel method. The photocatalytic dielectric combiner is functional in both indoor and outdoor application. The photocatalytic dielectric combiner can be placed on almost any substrate material, including but not limited to plastics, metals, polymers, polytetrafluoroethylene (PTFE, or more commonly known as Teflon®), or composites, to achieve high UV reflectance and high photopic transmittance.

The photocatalytic dielectric combiner can also provide a viable alternative to decorative electroplated finishes. When a hard dielectric decorative reflective layer, such as chromium (Cr) or titanium nitride (TiN) is included as part of the dielectric element and is placed on top of a smooth leveling organic polymer, the ability to level and smooth raw castings is achieved. Commercially available thin optical film computer design codes with optimization routines are available with which dielectric coatings can be tailored. A suitable software package is FILMSHOW™ by FTG Software Associates, Princeton, N.J.

DETAIL DESCRIPTION OF THIS INVENTION

Figure 1:
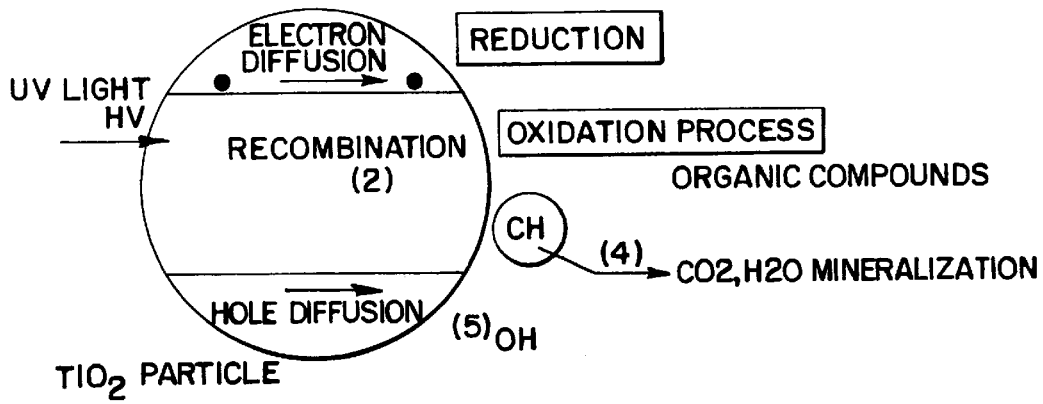
FIG. 1 is a simplified diagram of the photocatalytic oxidation of titanium dioxide.
Figure 2:
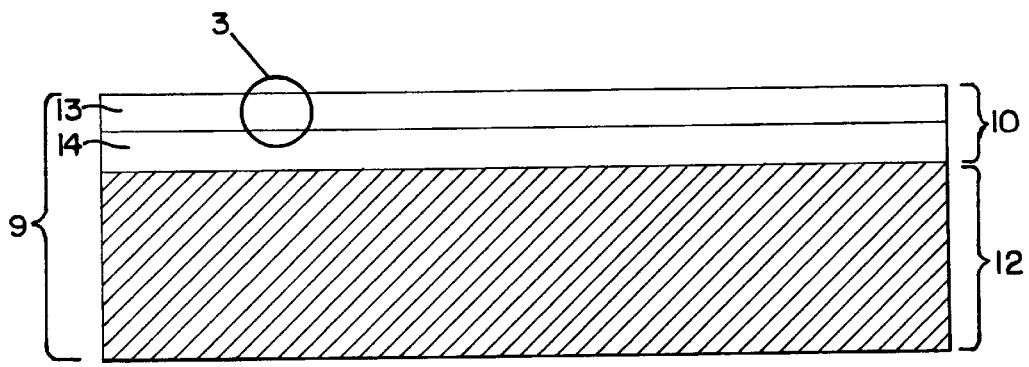
FIG. 2 is a simplified side-view of a photocatalytic dielectric combiner, referencing FIG. 1 and the photocatalytic oxidation reactions of titanium dioxide on the surface.

Referring to FIG. 1, a sectional view of a photocatalytic dielectric combiner in which $TiO_2$ is the photocatalytic material is shown. When the photon energy is greater than or equal to the band gap energy of $TiO_2$, i.e., E=3.2 ev or $\lambda \leq 400$ nm, an electron (e-) is promoted from the valence band into the conduction band, leaving a hole behind. Some of the electrons which have been excited into the conduction band and some of the holes in the valence band recombine and dissipate the input energy as heat. However, a number of holes can diffuse to the surface of the $TiO_2$ and react with $^-OH$ absorbed on the surface. This reaction forms $^-OH$ radicals, which can decompose the organic compounds existing on the surface into $CO_2$ and $H_2O$ because the potential energy of the $^-OH$ radical is greater than the bonding energy of almost all organic compounds. Referring to FIG. 2, a thin dielectric film 10 deposited upon a substrate material 12 may be composed of metal, plastic, composite, PTFE, or any combination thereof. The thin dielectric film 10 is comprised of a plurality of alternating layers 13, 14 wherein each of the alternating layers has a high index of refraction so as to maximize the angular bandwidth reflected. Preferably the material forming each of the two alternating layers has an index of refraction greater than 2.0. Additionally, the difference in the refractive index of the materials forming each of the two alternating layers is as small as possible to also increase the reflected angular bandwidth.

Figure 3:
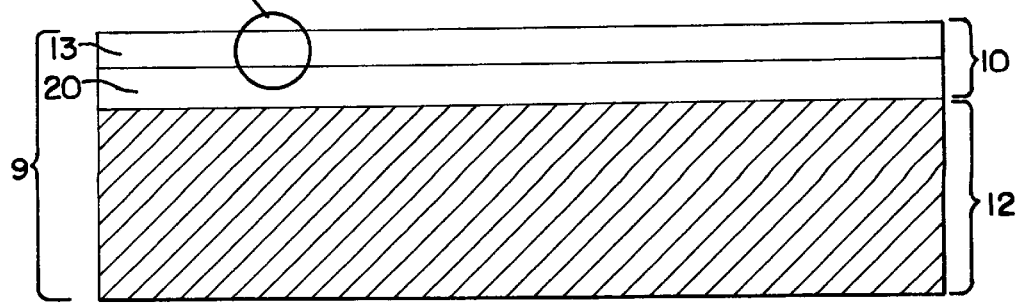
FIG. 3 is an alternative embodiment to that shown in FIG. 2.

Preferably, the thin dielectric film 10 is formed of a plurality of alternating layers of photocatalytic titanium dioxide ($TiO_2$) 13, having an index of refraction of 2.49, and sub-layers of either tantalum oxide ($Ta_2O_5$) 14, or zirconium oxide ($ZrO_2$), each of which has an index of refraction of 2.25. Alternatively, referring to FIG. 3, the thin dielectric film 10 may be comprised of a plurality of sub-layers of aluminum oxide ($Al_2O_3$) 20 and photocatalytic titanium dioxide ($TiO_2$) 13, or silicon dioxide ($SiO_2$) and photocatalytic titanium dioxide ($TiO_2$), which are alternatively deposited upon the substrate 12. However, other compounds may be utilized if they are durable and have appropriate indices of refraction for the wavelength of light which is desired to be reflected. The exterior surface of the plurality of layers is covered by the photocatalysis 13 which is composed of photocatalytic titanium dioxide ($TiO_2$) to induce photocatalytic reactions on the surface of the combiner element. Additionally, dielectric film 10 is designed to reflect light waves with a wavelength within a predetermined spectrum, as hereinafter described, while remaining highly transmissive for light waves of all other wavelengths.

While the layers may be of any desired thickness, the layers are preferably of the third order such that the mechanical thickness of each of the individual layers is determined by the formula:

$$\text{mechanical thickness} = (3x\lambda)/(4xn)$$

where $\lambda$ is the wavelength of light to be reflected by the dielectric combiner and "n" is the index of refraction of the material forming the particular layer. By utilizing third order layers, the number of necessary layers is deceased to simplify the design and fabrication of the combiner. The formula assumes a 0° angle of incidence between the incident light wave and a line perpendicular to the surface of the combiner. For example, the wavelength of light to be reflected may be 400 nanometers, and the index of refraction for a thin film of titanium dioxide ($TiO_2$) would be 120.5 nanometers. An identical procedure is also utilized to determine the thickness of other layers. The wavelength of light to be reflected may thus be precisely controlled by the choice of an appropriate thickness for the individual dielectric layers. The thin photocatalytic dielectric film 13 and sublayers may be deposited upon the substrate 12 by any of the traditional methods utilized for dielectric deposition, such as electron beam physical vapor deposition. Therefore, the photocatalytic dielectric combiner 9 does not necessitate the complex wet chemical development processing for photocatalytic reactions required by the sol-gel method. Additional, the photocatalytic dielectric combiner 9 is less likely to delaminate or suffer abrasion under normal conditions. Two environmentally stable coating methods for producing dielectric films are available reactive ion plating (RIP) and ion assisted deposition (IAD). Both are vacuum deposition methods that produce dense, hard dielectric thin films without columnar microstructures, and each can be produced by similar ion beam technology. Both Optical Coating Laboratory, Inc. of Santa Rosa, Calif. and Omitec Thin Films Ltd., of Totnes, England are examples of facilities where dielectric thin films can be made using IAD techniques and then tailored as demanded by performance requirements. Both processes are also desirable because they enable multiple identical UV enhanced combiners to be produced within a vacuum chamber at the same time.

Figure 4:
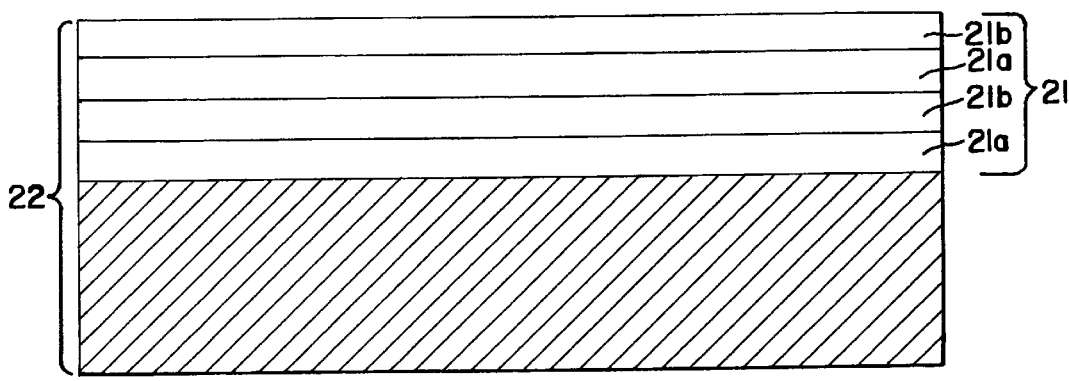
FIG. 4 is a simplified side-view of a photocatalytic dielectric combiner showing first and second dielectric materials being the same.

An alternative embodiment is provided, referring to FIG. 4, whereby the plurality of alternating layers making up the thin photocatalytic dielectric film 20 are comprised of the same material. In this alternative embodiment the layers, while being comprised of the same material are deposited in an alternating fashion by reactive ion plating and evaporative coating. Reactive ion plating provides a layer 21a of the material which is more dense than that provided by an evaporative coating 21b due to air gaps in the material introduced by evaporative coating. Thus the index of refraction of the material deposited by reactive ion plating is greater than that of the same material deposited by evaporative coating. A difference in the index of refraction of 0.2–0.3 is observed for photocatalytic titanium dioxide 21. Since the same materials is being deposited by both the reactive ion plating 21a and the evaporative coating methods 21b, the coefficient of thermal expansion of the layers is identical although the index of refraction of the layers vary. Since the coefficient of thermal expansion is identical between the plurality of layers, each layer will expand or contract at an equivalent rate such that delaminations do not occur. However, the plurality of layers forming the thin dielectric film 21 will provide alternating layers having differing indices of refraction so as to provide the necessary reflection of UV within the desired wavelength band and enable the combiner 22 to properly function as referenced in FIG. 1.

Figure 5:
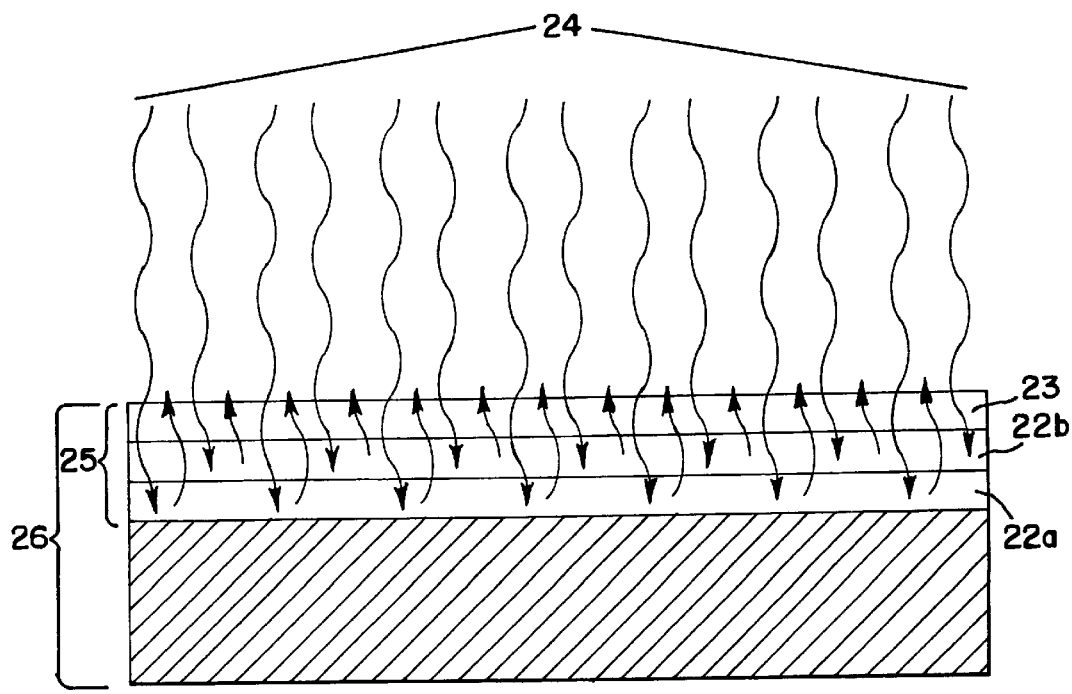
FIG. 5 is a side-view of a photocatalytic dielectric combiner with a transmissive cover reflecting UV.

An additional embodiment, referring to FIG. 5, is provided whereby a plurality of alternating layers of photocatalytic titanium dioxide ($TiO_2$) 22a,b are designed to filter and reflect light waves of a certain wavelength within a predetermined spectrum. The layers 22a,b are covered by a transmissive layer 23, chosen to be transmissive for light at all wavelengths, to thereby form a photocatalytic dielectric combiner substage concentrator 26 that reflects at least 98% of UV 24 back through to the surface of the transmissive layer 23 of the combiner element 25. By allowing light of all wavelengths to pass through the transmissive layer, the light can then be filtered by the plurality of dielectric films 22a,b underneath. The dielectric films 22a,b then reflect UV back through to the surface of the transmissive layer, thus increasing UV at the surface of the transmissive layer by two fold and also producing an excellent UV resistant barrier. It is doubtful electrons of the photocatalytic titanium dioxide ($TiO_2$) could force through the transmissive dielectric film 23 to induce true photocatalytic reactions in the presence of UV as shown in FIG. 1. However, such an embodiment functions as an excellent UV reflective concentrator, which could be used to reflect a concentration of UV to an alternate photocatalytic dielectric combiner and induce photocatalytic reactions.

The photocatalytic dielectric combiner sub-stage concentrator 26 is formed of a plurality of alternating layers of photocatalytic titanium dioxide ($TiO_2$) 22a,b having an index of refraction of 2.49. Alternatively, the thin dielectric transmissive cover film 25 may be comprised of a plurality of layers of aluminum oxide ($Al_2O3$) and silicon dioxide ($SiO_2$) which are alternatively deposited upon the photocatalytic titanium dioxide 22a,b. However, other compounds could be utilized if they are durable and have appropriate indices of refraction for the wavelength of light which is desired to be reflected. The plurality of layers are covered by a transmissive layer 23 which may be composed of silicon dioxide ($SiO_2$).

Figure 6:
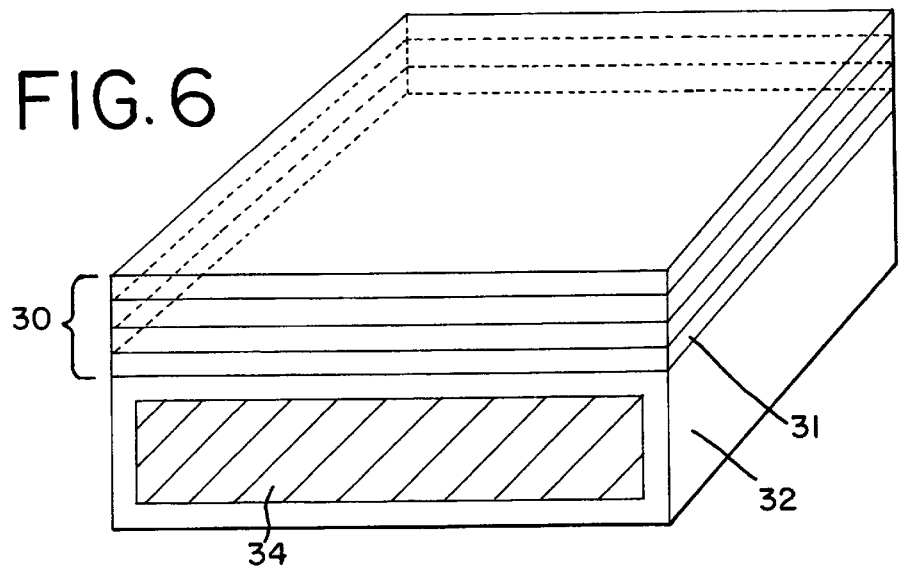
FIG. 6 is a cross-sectional view of a metal casting covered by a hard organic leveling polymer, with a photocatalytic dielectric combiner element which includes a decorative reflective layer placed on top of the polymer.

An additional preferred embodiment that is within the scope of this invention referring to FIG. 6 provides a photocatalytic decorative self-cleaning, self-sanitizing, and self-deodorizing surface. This embodiment may be used for the replacement of electroplating in decorative applications by adding to the photocatalytic dielecric combiner element 30 underneath or within the plurality of layers a decorative reflective layer 31 of a vacuum deposited material, in either pure form, oxide form, nitride form, or oxynitride form. Such deposited material may include chromium (Cr), silver (Ag), gold (au), platinum (Pt), aluminum (Al), titanium (Ti), zirconium (Zr), etc. The result is a decorative reflective finish within the photocatalytic dielectric combiner 30, when placed upon a hard polymer 32, that has the ability to level raw unfinished substrates 34, such as castings. A suitable hard high temperature polymer called a organic polyplate barrier (OPB), furnished by Simtek Industries, Inc., of Jackson, Mississippi, has the ability to form a smooth hard surface over raw casting, and also provides additional corrosion resistance for metal castings. These features are in addition to the OPB's ability to function at temperatures above 300° C. The OPB is deposited over raw, dull, or unfinished substrates by dip or spin coating and, when hardened, the OPB provides a specular, level, smooth, hard surface over all exposed areas of the substrate. The OPB replaces the copper leveling step in the electroplating process and may also replace the depositing of nickel—a second step in the plating process—by forming a hard specular surface in preparation for the photocatalytic dielectric element 30 deposited by reactive ion plating and evaporative coating.

Drawbacks of other thin film technology, such as physical vapor deposition (PVD) techniques, would be that coatings are usually porous. These micropores, as they are called, are undetectable by the eye, but can be seen under SEM. The micropores can cause serious corrosion problems when the underlying substrate is metal. Though the thin film itself is basically inert and corrosion resistant, the porous nature of the thin film structure causes galvanic cells to set up and begin corroding, and causes erosion of the underlying material the cells are placed upon. This is why an organic polymer similar to the OPB would provide added assurance and reduce the likelihood of coating failure on metal castings.

The preferred OPB has a 3-phase or 3-stage interlock or cross-linking of polymer bonds. The first interlock occurs after solvent evaporation, the second interlock occurs when the OPB is introduced to IR, and the final interlock occurs during light ion bombardment of the OPB in a vacuum chamber prior to the deposition of inorganic materials. In this preferred embodiment, the OPB is demonstrated on a finished or unfinished raw casting (substrate). The substrate material is a metal or metal alloy—which could be brass, zinc, or aluminum—that has a surface desparity between 0.25 mils to 5.0 mils. The substrate maybe from 0.001" to 15" thick, preferably 0.003" to 2" thick. In this embodiment, the substrate is zinc. The OPB when applied to the zinc substrate, levels the surface disparity, to a smooth specular surface.

Figure 7:
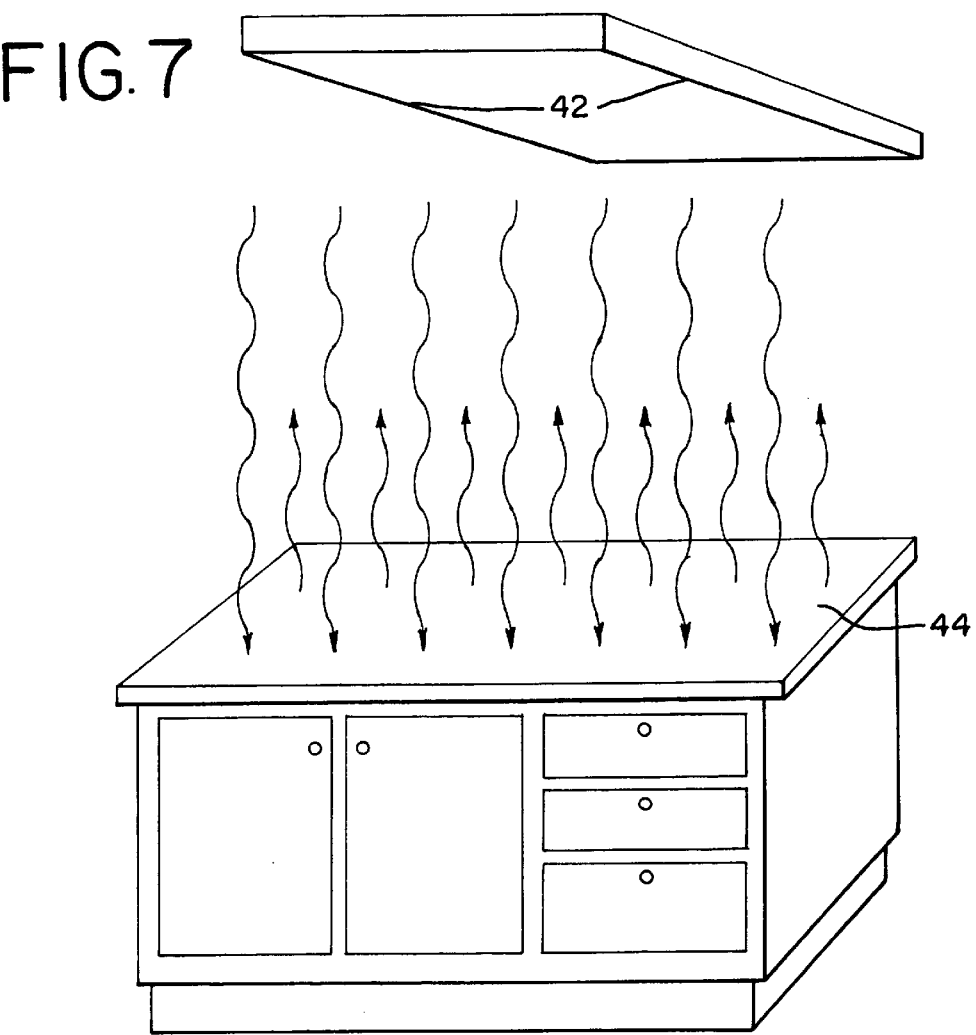
FIG. 7 is an example illustrating one possible use of the photocatalytic dielectric combiners of FIG. 5.
Figure 8:
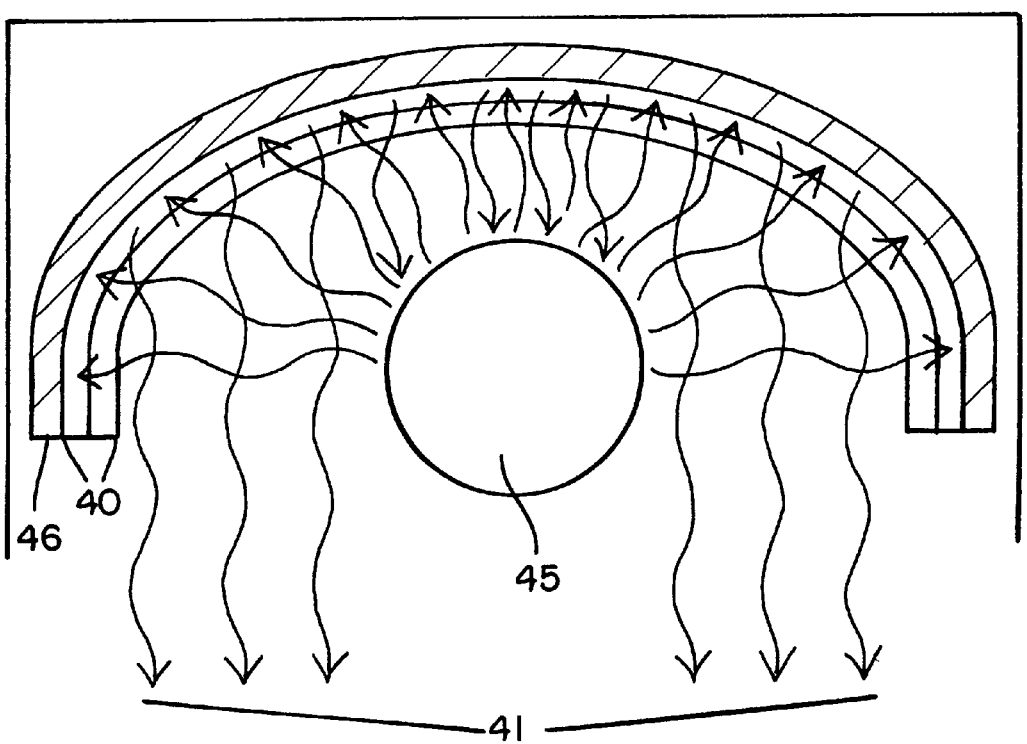
FIG. 8 is an enlarged cross-sectional view of a light fixture shown in FIG. 7 with the photocatalytic dielectric combiner of FIG. 5.

An additional preferred embodiment referring to FIG. 7, is for indoor applications or environments without sunlight where the UV source is an ordinary lighting fixture 42, such as a fluorescent light fixture. The photocatalytic dielectric combiner sub-stage concentrator, such as shown in FIG. 5, is placed on the reflector 46 of the fluorescent light fixture 40 to concentrate the UV emitting 41 from the fluorescent lamp 45. This makes the lamp an enhanced emitter that is designed with narrow contoured bandwidths to enhance and maximize UV emitting from the fluorescent light source and reflects it onto an underlying alternate surface or substrate like a counter top 44, as shown in FIG. 7. This will induce photocatalytic reactions, as referenced in FIG. 1, on the alternate surface upon which a corresponding photocatalytic dielectric combiner is placed on, to provide a self-cleaning, self-sanitizing and self-deodorizing surface. In addition to the context of a self-cleaning, self-sanitizing, and self-deodorizing photocatalytic surface coating, and the possibilities of replacing electroplating, in which the photocatalytic dielectric combiner has been discussed, it is possible that the photocatalytic dielectric combiner could be utilized in many other applications, such as UV protective applications, sun-glasses, or window coverings. Although there has been illustrated and described specific detail and structure of operations, it is clearly understood that changes and modifications may be readily made therein by those skilled in the art without departing from the spirit and the scope of this invention.

What is claimed is:

1. A photocatalytic dielectric combiner, comprising:
   a) a substrate;
   b) a plurality of dielectric layers comprised of alternating layers of a first dielectric material and a second dielectric material, each layer having a high index of refraction, deposited upon the substrate for reflecting UV within a predetermined spectrum and otherwise transmitting light wherein the index of refraction of both the first dielectric material and the second dielectric material are different from each other, and each is greater than 2.0; and
   c) a photocatalytic coating of $TiO_2$ disposed on the dielectric layer opposite the substrate designed to induce photocatalytic reactions in the presence of UV to provide a self-cleaning, self-sanitizing, and self-deodorizing combiner surface.

2. The photocatalytic dielectric combiner as recited in claim 1, wherein the first dielectric material is selected from a group including tantalum oxide ($Ta_2O_5$) and zirconium oxide ($ZrO_2$) and the second dielectric material is photocatalytic titanium oxide ($TiO_2$).

3. The photocatalytic dielectric combiner as recited in claim 1, wherein both the first dielectric material and the second dielectric material are comprised of the same material, the first dielectric material being deposited by means of reactive ion plating, the second dielectric material being deposited by evaporative coating.

4. The photocatalytic dielectric combiner as recited in claim 3, wherein both the first and second dielectric materials are photocatalytic titanium oxide ($TiO_2$) with indices of refraction greater than 2.0.

5. The photocatalytic dielectric combiner as recited in claim 3, further comprising:
   a decorative reflective layer, deposited upon a hard organic leveling polymer which has been placed onto a layer of the combiner by one of the methods of dip coating or spin coating
   wherein the decorative reflective layer is in one of either a pure form, oxide form, nitride form or oxynitride form, and is selected from the materials including deposition chromium (Cr), silver (Ag), gold (Au), platinum (Pt), aluminum (Al), titanium (Ti), or zirconium (Zr).

6. The photocatalytic dielectric combiner as recited in claim 3, further comprising a decorative reflective layer deposited onto a layer of the combiner stack and a hard organic leveling polymer onto the decorative reflective layer by one of the methods of either dip coating or spin coating, wherein the decorative reflective layer is in one of either a pure form, oxide form, nitride form or oxynitride form, and is selected from the materials including deposition chromium (Cr), silver (Ag), gold (Au), platinum (Pt), aluminum (Al), titanium (Ti), or zirconium (Zr).

7. The photocatalytic dielectric combiner as recited in claim 1, further comprising a decorative reflective layer deposited upon a hard organic leveling polymer which has been placed onto a layer of the combiner by one of the methods of dip coating or spin coating wherein the decorative reflective layer is in one of either a pure form, oxide form, nitride form or oxynitride form, and is selected from the materials including deposition chromium (Cr), silver (Ag), gold (Au), platinum (Pt), aluminum (Al), titanium (Ti), or zirconium (Zr).

8. The photocatalytic dielectric combiner as recited in claim 1, wherein the substrate is comprised of a material selected from the group including plastics, metals, polytetrafluoroethylene (PTFE) or composites, and combinations thereof.

9. The photocatalytic dielectric combiner as recited in claim 1, wherein both the first dielectric material and the second dielectric material are comprised of the same material, the first dielectric material being deposited by means of reactive ion plating, the second dielectric material being deposited by another method.

10. The photocatalytic dielectric combiner sub stage concentrator, comprising:
    a) a photocatalytic dielectric combiner having a transmissive dielectric cover transmissive to all wavelengths of light for transmitting light there-through;
    b) a plurality of dielectric layers for reflecting a predetermined spectrum of light comprised of a first and a second dielectric material which are the same, reflect 98% of UV, and are transmissive to all other light and wherein the first and second dielectric materials have an index of refraction greater than 2.0 and
    c) wherein the plurality of dielectric layers concentrates and reflects UV back through the surface of the transmissive dielectric cover.

11. The photocatalytic dielectric combiner as recited in claim 10, wherein the first and second dielectric materials are photocatalytic titanium oxide ($TiO_2$) and the material of the transmissive dielectric cover is silicon dioxide ($SiO_2$).

12. The photocatalytic dielectric combiner as recited in claim 10, wherein both the first dielectric material and the second dielectric material are comprised of photocatalytic titanium oxide ($TiO_2$), with the first material being deposited by means of reactive ion plating and the second dielectric material being deposited by means of evaporative coating.

* * * * *